A. W. HALL.
Churn.
No. 55,287.
Patented June 5, 1866.
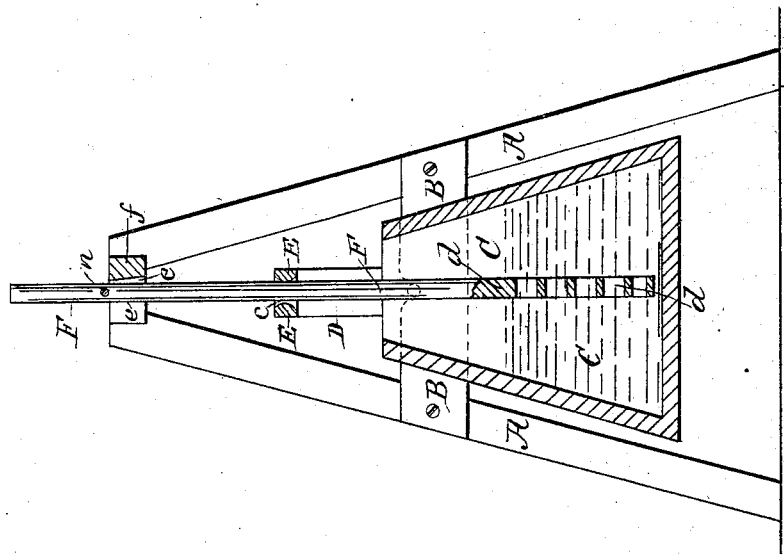
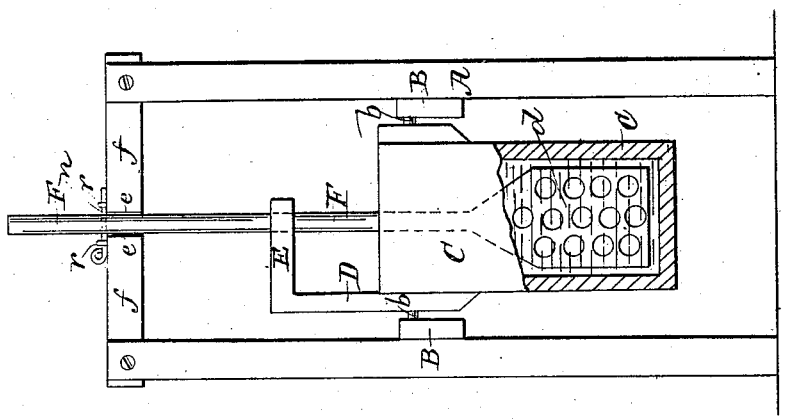
Witnesses
Inventor.
Alex W. Hall

UNITED STATES PATENT OFFICE.

ALEX. W. HALL, OF NEW YORK, N. Y.

IMPROVEMENT IN CHURNS.

Specification forming part of Letters Patent No. 55,287, dated June 5, 1866.

*To all whom it may concern:*

Be it known that I, ALEXANDER W. HALL, of the city, county, and State of New York, have invented a new and useful Improvement in Churns; and I do hereby declare that the following is a full, clear, and exact description of the same, reference being had to the accompanying drawings, making a part of this specification, in which—

Figure 1 is a front elevation. Fig. 2 is a central vertical section taken at right angles to Fig. 1.

Similar letters of reference indicate corresponding parts in both figures.

This invention consists in the combination of a swinging or vibrating dasher with the swinging body of a pendulum churn in such manner that while the said body with the milk or cream contained therein is moving in one direction the dasher is moved in an opposite direction, whereby the churn may be very easily and conveniently operated at the same time that the milk or cream contained in the body thereof is thoroughly agitated or churned by the action of the dasher and body.

To enable others to understand the construction and operation of my invention, I will proceed to describe it with reference to the drawings.

A represents an upright frame, to each side of which is firmly secured a horizontal bar, B, and formed centrally in the upper edge or side of each of these bars. B is a notch or socket, (shown in dotted lines in Fig. 2,) the said sockets $a$ being opposite each other.

C is the body of the churn, the two sides of which are vertical and parallel with each other, but the ends of which slope or incline inward at the top, as shown in Fig. 2.

Projecting out from each side of the body C, at the central parts of the upper ends of the said sides, is a strong pin or pivot, $b$. These pins $b$, being thus situated opposite each other upon the opposite sides of the body C, are placed in the notches or sockets $a$ of the bars B, so that the body C is suspended from the said bars B and swings freely upon the pins $b$, as represented in the drawings.

D is an upright bar, which is fixed centrally upon one side of the body C, and projecting up above the same has a horizontal transverse arm, E, fixed upon its upper end, the said arm E projecting over the middle portion of the body C, and having a vertical longitudinal slot formed in its outer end, as shown at $c$.

Inasmuch as the bar D is situated above the pins or pivots $b$, by which the body C is suspended, it follows that when the said body is swung in one direction it will vibrate the bar D, and consequently the horizontal arm E attached thereto, in an opposite direction.

F is the dasher, the lower end of which is shaped like a paddle and placed within the body C, as shown at $d$, while the central part of the said dasher passes through or is placed in the slot $c$ of the arm E.

The upper end of the dasher is placed in a vertical slot or notch, $e$, formed transversely in the cross-bar $f$ at the top of the frame A. A pin, $n$, is passed through a suitable transverse hole in the said upper end of the dasher F, and is placed longitudinally upon the upper side of the cross-bar $f$, and retained in position by suitable staples $r$. By this means the dasher is suspended on the aforesaid pin $n$, and is capable of swinging to and fro.

Any suitable quantity of milk or cream being placed in the body C, an oscillating or pendulum motion is communicated to the said body, either by pushing it with the hand or by any other suitable means, and inasmuch as the arm E is vibrated in an opposite direction to the movement of the body C, as hereinbefore explained, it follows that the said arm swings the dasher in a direction corresponding to its own movement, so that the oscillations of the dasher F and body C take place simultaneously in opposite directions, thus thoroughly agitating and churning the milk or cream.

What I claim as new, and desire to secure by Letters Patent, is—

The combination of a swinging or vibrating dasher with the swinging body of a churn in such manner that by the act of moving the body in one direction the dasher is moved in an opposite direction, substantially as herein set forth, for the purpose specified.

ALEX. W. HALL.

Witnesses:
 A. LE CLERC,
 J. W. COOMBS.